United States Patent [19]
Grow

[11] Patent Number: 4,566,657
[45] Date of Patent: Jan. 28, 1986

[54] SPAN LOADED FLYING WING CONTROL

[76] Inventor: Harlow B. Grow, 16530 Chattanooga Pl., Pacific Palisades, Calif. 90272

[21] Appl. No.: 211,517

[22] Filed: Dec. 1, 1980

Related U.S. Application Data

[63] Continuation of Ser. No. 40,663, May 21, 1979, abandoned.

[51] Int. Cl.[4] .......................... B64C 9/20; B64C 9/32; B64C 9/00
[52] U.S. Cl. .................................. 244/90 A; 244/113; 244/87; 244/215; 244/36
[58] Field of Search ............ 244/13, 36, 90 A, 110 D, 244/113, 213, 215, 217

[56] References Cited

U.S. PATENT DOCUMENTS

| | | | |
|---|---|---|---|
| 2,406,506 | 8/1946 | Northrop | 244/13 |
| 2,431,449 | 11/1947 | Ashkenas et al. | 244/13 |
| 2,650,780 | 9/1953 | Northrup et al. | 244/36 |
| 4,040,580 | 8/1977 | Schwaerzler | 244/113 |

FOREIGN PATENT DOCUMENTS

| | | | |
|---|---|---|---|
| 708447 | 7/1941 | Fed. Rep. of Germany | 244/113 |
| 744668 | 11/1943 | Fed. Rep. of Germany | 244/113 |
| 877353 | 12/1942 | France | 244/113 |

Primary Examiner—Trygve M. Blix
Assistant Examiner—Rodney Corl
Attorney, Agent, or Firm—William H. Maxwell

[57] ABSTRACT

A flying wing aircraft control for angle of attack and direction thereof, comprising retractile controlling surfaces rearward of the center of lift and along the trailing edges and extensible over the top and bottom cambers of the wing in spaced relation to the trailing portions thereof and with variable angular dispositions with respect to air flow over the cambers so as to establish the desired moment arm with respect to the lift center of the flying wing to control the same into and out of a nose-up attitude with respect to the line of flight and with respect to direction, as required.

14 Claims, 3 Drawing Figures

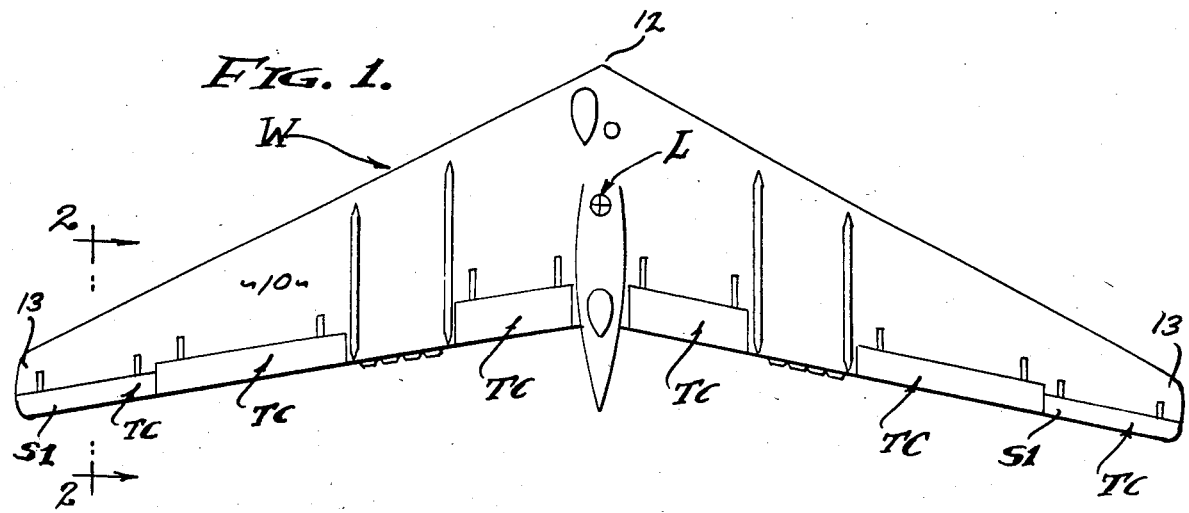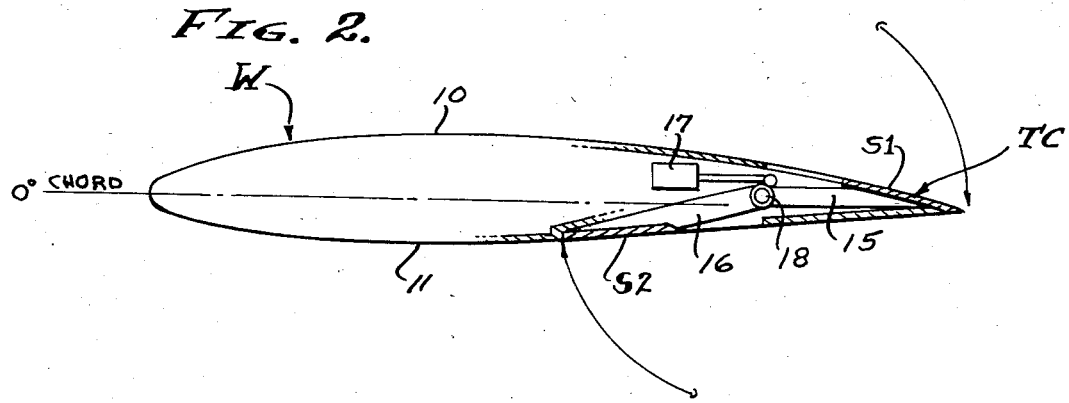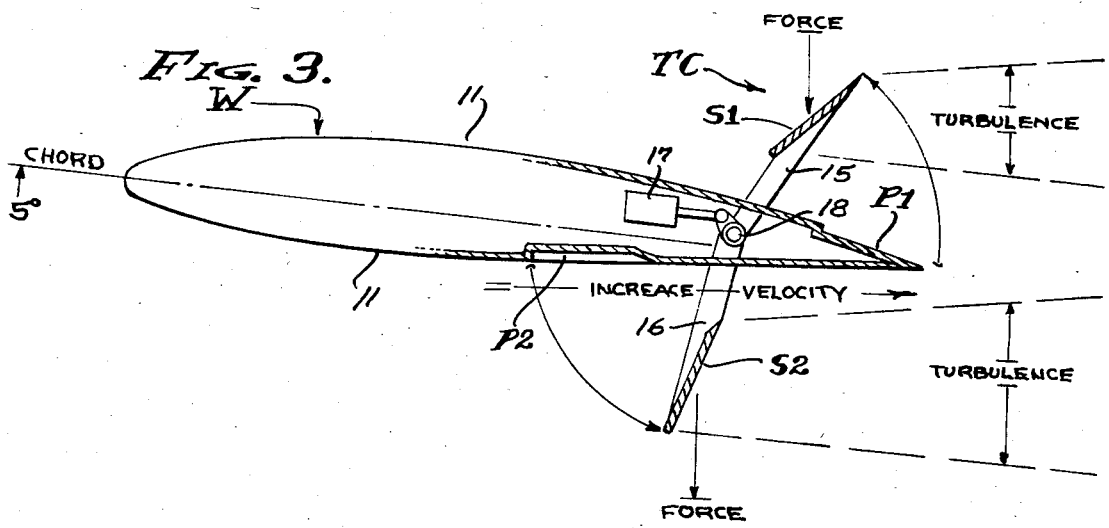

SPAN LOADED FLYING WING CONTROL

This application is a continuation of application Ser. No. 40,663 filed May 21, 1979, now abandoned.

BACKGROUND

The angle of attack is of primary concern in the operation of aircraft wings, during both take-off and landing, and during flight as well. In conventional aircraft having a tail section and empenage control surfaces, the wing is attached at a positive four or five degree angle relative to the fuselage and normal trim plane of the horizontal stabilizer. However, in "flying wing" and "span loader" type aircraft devoid of tail sections and rearwardly extended empenage control surfaces there is an inherent absence of means to establish the most necessary moment of force required to controllably vary the angle of attack. Therefore, the line and force of thrust has been employed to implement increased angle of attack attitudes, but with tragic results as when a nose-down attitude is accompanied with too great an air speed; in which case flying wing aircraft have failed when the pilots were unwaringly and/or unavoidably entrapped in such situations. Accordingly, it is a general object of this invention to provide means by which downward force is applied to flying wing or span loader aircraft to controllably increase the wing angle of attack, to control roll, and to control direction, thereby establishing attitude changes and lift as circumstances require.

Span loaded flying wings have great advantages over conventional fuselage aircraft, having reduced parasite drag for increased speed, range and high performance characteristics. Also, load distribution throughout the wing configuration has its structural advantages. Flight control is executed in a normal fashion and differs from conventional aircraft only in a minor degree, utilizing for example, flaps to produce drag at the wing tip in place of a rudder per se. In practice the rudder flaps have formed a portion of the "trim flaps" and which are loacted at the wing tips and adjusted up or down to trim the aircraft longitudinally to the desired angle of attack attitude. Maneuverability of the flying wing is by means of "elevons" combining the functions of elevator and aileron and located along the trailing edge inboard of the aforesaid trim flap. Additionally, landing flaps are employed inboard of said ailerons and/or elevons. A characteristic of the said trim flap control is its "spoiler" effect which disturbes air flow over the upper camber of the wing and reduces lift. Therefore, greater wing area is required while the trim effect is restricted by the closely coupled moment arm over such trim flaps as related to the center of lift of the wing. Accordingly, it is an ofject of this invention to provide means to remove air flow disturbances from the wing surfaces and to increase the moment arm effectiveness of reactive air control surfaces, in order to control the positive angle of attack and direction of flight, as may be required.

The necessity of controlled angle of wing attack cannot be over emphasized, for optimum take-off characteristics, for in-flight attitude corrections and altitude changes, and for landing characteristics as well. For example, on take-off there are two distinct speed conditions; V1 which is the speed at which flight is committed, taking into account all factors including load, runway length, altitude, wind, temperature and pressure, and obstacles etc.; and V2 which is the speed at which the aircraft is to be rotated into a climbing attitude. It is the transistion between wing attitudes complying with these two speed conditions with which this invention is concerned on take-off, and landing as well. In flight and on landing, this invention is concerned with wing attitude adjustability without resort to changes in thrust, and especially without the requirement of increasing thrust. For example, angle of wing attack is not to be increased in reliance upon an increase in thrust; and on the contrary is increased independent of thrust applied. Accordingly, it is another object of this invention to provide control surfaces independent of the thrust applied and which determines the positive angle of wing attack, whereby transistion from a V1 condition into a V2 condition can be effected to rotate the aircraft on take-off, and to advantageously apply a nose-up attitude in flight and at lower speeds for landing.

In carrying out this invention there are retractile control surfaces that extend into clear air separated from the supporting wing camber (top and bottom). In practice, extension of said control surfaces increases their angle of deflection to establish controllable downward thrust at the trailing edges of the wing (left and right). The lever effect with respect to the center of lift is enhanced by the swept wing configuration, applying a downward force that rotates the wing to increase the angle of attack. Simultaneously there is turbulent airflow around said control surfaces, creating the desirable drag for controlling air speed and directional stability. It is therefore an object of this invention to provide a simple and rugged structural form of means inherently balanced and requiring minimum force application for its operation.

SUMMARY OF INVENTION

This invention relates to flying wing or span loaded wing aircraft, wherin directional stability and angle of attack is by means of trimming the aircraft at the trailing edges of the wing. In practicing this invention there are upper and lower retractile control surfaces along each trailing edge, extending inboard from the wing tip. In the case of both upper and lower controllable surfaces, angularity to the line of flight increases with extension thereof to create an increasing downward controlling force and to create a commensurately increasing drag. A feature is that the two controlling surfaces move into remote positions with respect to the upper and lower cambers of the wing and thereby have little or no adverse effect upon the boundry layer of air passing over and under the wing. However, advantage is gained with respect to the lower control surface which, being upwardly turned with respect to the air stream, establishes a convergent slot that increases air velocity so as to lower the pressure against the bottom camber of the wing at the trailing edge portion thereof, thereby negating or greatly reducing the upward thrust effect thereagainst. Extension and retraction of these control surfaces is by conventional pilot controls (not shown) through servo means or the like as indicated.

The foregoing and other various objects and features of this invention will be apparent and fully understood from the following detailed description of the typical preferreed form and application thereof, throughout which description reference is made to the accompanying drawings.

DESCRIPTION OF THE DRAWINGS

FIG. 1 is a plan view of a powered flying wing aircraft incorporating the control therefor disclosed herein.

FIG. 2 is a longitudinal sectional view through a typical control portion of the wing taken as indicated by line 2—2 on FIG. 1, showing the control surfaces retracted and the wing at a zero degree of attack.

FIG. 3 is a view similar to FIG. 2 showing the control surfaces extended and the wing at an increased angle of attack.

PREFERRED EMBODIMENT

The aircraft under consideration is of the flying wing or span loader type, and which may be powered according to my U.S. Pat. No. 4,026,500 entitled AIRCRAFT WING WITH INTERNAL FLOW CONTROL PROPULSION, issued May 31, 1977. The flight controls for such aircraft are quite conventional insofar as pilot operation is concerned. However, certain differences are involved in the directional stability control surfaces as related to the conventional rudder, elevator, ailerons, flaps and trim tabs. Any one or all of the conventional control surfaces are replaced by the trim control TC of the present invention, in each instance operating on the application of downward force and resultant drag. Quite different however is the rudder function in conventional flying wings which employ independently operable flaps at the opposite wing tips. It is said conventional control surfaces which are supplemented or replaced by the attitude and directional control means of the present invention. Accordingly, the trim control TC is disclosed herein as a separate control means that replaces any one or all of the conventional control surfaces used in the normal process of flying an aircraft, powered aircraft or gliders.

The flying wing W is a combination of elements and components comprised of the basic wing structure having upper and lower cambers 10 and 11, swept back from a nose 12 to opposite wing tips 13. The center of lift L is located substantially as shown, and which of course varies dependent upon wing design and the angle of attack. The aircraft also includes all necessary features for its useful operation, including thrust means, landing gear, directional controls, and a pilot compartment and/or cabin for passengers and cargo.

The trim control TC is provided for adjusting the directional attitude of the flying wing, including the desired angle of attack. With flying wings, devoid of a fuselage and any angle of incidence between a fuselage centerline and root chord line of a wing, the ground angle and angle of attack are the same and coincidental with the root chord line of the wing. Therefore, the angle of attack of the flying wing is to be related to the ground horizontal and as well to the flight plane in lieu of the aforesaid angle of incidence. It is this relationship to the flight plane which establishes the ever so important nose-up attitude which is created with the trim control TC which involves retractile upper and lower control surfaces S1 and S2 extensible above and below the wing camber 10 and 11 over the trailing portion of the wing. A feature of the control surfaces S1 and S2 is their angularity to the flight plane, and disposed to react downwardly in the clear air stream above and below the wing; replacing any one or all of the conventional control surfaces including rudders, elevators, ailerons, flaps and trim tabs.

The wing structure is recessed and/or provided with pockets P1 and P2 to receive the control surfaces S1 and S2, there being a pocket P1 along each trailing edge and in the upper camber 10 to receive the control surface S1 flush with the camber 10, and there being a pocket P2 forward of each trailing edge and in the lower camber 11 to receive the control surface S2 flush with the camber 11. In practice, the plan configuration of the control surfaces and pockets therefore is substantially rectangular in each instance.

As is clearly shown in the drawings, the control surfaces S1 and S2 are planar members that become fair continuations of the cambered wing surfaces when retracted flush therewith. However, as they are extended their angularity with respect to the chord line and to the line of flight or flight plane is increased. In practice, the control surfaces are secured to integral lever arms 15 and 16 pivoted from a common fulcrum 18, essentially a first class lever whereby the control surfaces S1 and S2 are balanced in positions above and below the wing W. Accordingly, the control surfaces are like planar members fixed to the arms 15 and 16 to move therewith from retracted positions to angularly inclined positions, angularity increasing with the extention thereof. A servo 17 is shown to move the lever and control arm system to selected positions between the retracted and maximum extended positions shown. Rudder functioning is by means of differential positioning by the servos 17 at opposite wings, the control surfaces being oppositely extended and/or retracted one relative to the other. Elevator and angle of attack functioning is by means of unison positioning by the servos 17 at opposite wings, the control surfaces being simultaneously extended or retracted. Aileron functioning is by means of differential positioning by the servos 17 along opposite wing trailing edges, the control surfaces being oppositely extended and/or retracted one relative to the other. Flap functioning is by means of unison positioning by the servos 17 at opposite wings, the inboard control surfaces being simultaneously extended or retracted. And, trim functioning is by means of descrete application of unison and/or differential positioning adjustment by the servos 17 as may be required.

It will be observed that the center of lift L of wing W is substantially forward of the wing trailing portions where the trim control TC is effective in providing downward force reactively from the angular disposition of the control surfaces from the flight plane or line of flight. Accordingly, the control surfaces S1 and S2 are placed in optimum positions with respect to the center of lift L in order to maximize the moment arm effectiveness to rotate the wing into the angle of attack desired, as related to the ground horizontal or flight plane as the case may be.

From the foregoing it will be apparent that the trim control TC structure is simple and sound. Force applied against either control surface S1 or S2 is equalized by the other, while downward force is increasingly exerted thereby as the arms 15 and 16 are extended. The said control surfaces are carried by one or more arms as circumstances require, on common axes as shown. In practice, the span of each control surface remains parallel with the cambered surface of the wing at the trailing portion thereof. And when extended, the control surfaces S1 and S2 produce drag for directional stability, acting as the rudder, elevator, aileron, flap or trim tab that directs the flying wing W. And as stated at the outset, the drag effect is remote from the wing camber so as to operate away from the lifting air flow over the wing, and with a velocity increase within the lower slot formed thereby decreasing the lift at the underside of the trailing edge portion of the wing. Accordingly, angle of attack to the line of flight is controllably increased or decreased while directional control is applied, all as circumstances require.

Having described only a typical preferred form and application of my invention, I do not wish to be limited or restricted to the specific details herein set forth, but wish to reserve to myself any modifications or variations that may appear to those skilled in the art as set forth within the limits of the following claims:

I claim:

1. A flying wing aircraft control for inducing angle of attack and controlling the line of flight, and including;
    a wing having upper and lower cambered surfaces and a center of lift substantially forward of a trailing edge establishing a moment arm therebetween,
    upper and lower trailing edge pitch control surfaces aft of the center of lift and retractile substantially coincidental with the upper and lower cambered surfaces of the wing,
    lever means to space said upper and lower pitch control surfaces into the air stream above and below said upper and lower cambered surfaces of the wing and inclined upwardly with respect to the air stream continuing to flow over and under the wing for reaction downwardly at the trailing edge of the wing,
    and means positioning the lever means to extend and retract said pitch control surfaces for adjusting the downward force reaction on said moment arm and resultant pitch control of the flying wing aircraft.

2. The flying wing aircraft control as set forth in claim 1, wherein the wing is of swept-back configuration placing the center of lift substantially forward of the trailing edge portion of the wing tips for maximizing the rotative moment arm applied by downward force of the said control surfaces.

3. The flying wing aircraft control as set forth in claim 1, wherein the upper and lower control surfaces are retractile into pockets in the upper and lower cambered trailing surfaces of the wing to be flush therewith when fully retracted.

4. The flying wing aircraft control as set forth in claim 1, wherein the upper and lower control surfaces are flat planar members disposed spanwise in parallel relation to the upper and lower cambered surfaces of the trailing edge portion of the wing.

5. The flying wing aircraft control as set forth in claim 1, wherein the lever means is a first class lever disposed on a spanwise axis aft of the center of lift and extending rearwardly to swing the upper control surface into the air stream above the upper cambered surface of the trailing edge portion, to apply downward force at the trailing edge portion of the wing.

6. The flying wing aircraft control as set forth in claim 1, wherein the lever means is a first class lever disposed on a spanwise axis aft of the center of lift and extending forwardly to swing the lower control surface into the air stream below the lower cambered surface of the trailing edge portion, to apply downward force at the trailing edge portion of the wing.

7. The flying wing aircraft control as set forth in claim 1, wherein the lever means is a first class lever disposed on a spanwise axis aft of the center of lift and with integral arms extending rearwardly and forwardly respectively to swing the upper and lower control surfaces into the air stream above and below the upper and lower cambered surfaces of the trailing edge portion, to apply balanced downward force above and below the trailing edge portion of the wing.

8. The flying wing aircraft control as set forth in claim 1, wherin the lever means is a first class lever disposed on a spanwise axis aft of the center of lift and extending rearwardly and fixed to the upper control surface to swing upward and forwardly with increasing angular inclination into the air stream above the upper cambered surface of the trailing edge portion, to apply downward force at the trailing edge portion of the wing.

9. The flying wing aircraft control as set forth in claim 1, wherein the lever means is a first class lever disposed on a spanwise axis aft of the center of lift and extending forwardly and fixed to the lower control surface to swing downward and rearwardly with increasing angular inclination into the air stream below the lower cambered surface of the trailing edge portion, to apply downward force at the trailing edge portion of the wing.

10. The flying wing aircraft control as set forth in claim 1, wherein the lever means is a first class lever disposed on a spanwise axis aft of the center of lift and with integral arms extending rearwardly and forwardly respectively and fixed to the upper and lower control surfaces to swing the upper and lower control surfaces into the air streams above and below the upper and lower cambered surfaces of the trailing edge portion with increasing angular inclination, to apply balanced downward force above and below the trailing edge portion of the wing.

11. The flying wing aircraft control as set forth in claim 1, wherein the means positioning the lever means operates in unison at opposite wing tips to equally apply the said downward force for increasing angle of attack.

12. The flying wing aircraft control as set forth in claim 1, wherein the means positioning the lever means operates differentially at opposite wing tips to apply unequal drag force for rudder and aileron function to direct the aircraft.

13. The flying wing aircraft control as set forth in claim 1, wherein the means positioning the lever means operates in unison and differentially at opposite wing tips to equally apply the said downward force for increasing angle of attack and to apply unequal drag force for rudder and aileron functions to direct the aircraft.

14. The flying wing aircraft control as set forth in claim 1, wherein the wing is of swept-back configuration placing the center of lift substantially forward of the trailing edge portion of the wing tips for maximizing the rotative moment arm applied by downward force of the said control surfaces, wherein the upper and lower control surfaces are flat planar members disposed spanwise in parallel relation to the upper and lower cambered surfaces of the trailing edge portion of the wing tips and are retractile into pockets in the upper and lower cambered trailing surfaces of the wing to be flush therewith when fully retracted, wherein the lever means is a first class lever disposed on a spanwise axis aft of the center of lift and with integral arms extending rearwardly and forwardly respectively and fixed to the upper and lower control surfaces to swing the upper and lower control surfaces into the air streams above and below the upper and lower cambered surfaces of the trailing edge portion with increasing angular inclination to apply balanced downward force above and below opposite wing tips, and wherein the means positioning the lever means operates in unison to equally apply the said downward force for increasing angle of attack and operates differentially to apply unequal drag forces for rudder and aileron functions to direct the aircraft.

* * * * *